United States Patent
Li

(10) Patent No.: US 10,886,899 B2
(45) Date of Patent: Jan. 5, 2021

(54) LOW-POWER-CONSUMPTION CONSTANT-ON-TIME TIMING CIRCUIT DESIGN METHOD AND TIMING CIRCUIT

(71) Applicant: Sichuan Energy Internet Research Institute, Tsinghua University, Sichuan (CN)

(72) Inventor: Yike Li, Sichuan (CN)

(73) Assignee: Sichuan Energy Internet Research Institute, Tsinghua University, Sichuan (CN)

( * ) Notice: Subject to any disclaimer, the term of this patent is extended or adjusted under 35 U.S.C. 154(b) by 0 days.

(21) Appl. No.: 16/470,816

(22) PCT Filed: Dec. 26, 2017

(86) PCT No.: PCT/CN2017/118587
§ 371 (c)(1),
(2) Date: Jun. 18, 2019

(87) PCT Pub. No.: WO2019/114031
PCT Pub. Date: Jun. 20, 2019

(65) Prior Publication Data
US 2020/0212894 A1    Jul. 2, 2020

(30) Foreign Application Priority Data

Dec. 12, 2017  (CN) .......................... 2017 1 1313763

(51) Int. Cl.
*H03K 3/012*    (2006.01)
*G06F 30/396*   (2020.01)
*H03K 5/24*     (2006.01)

(52) U.S. Cl.
CPC .......... *H03K 3/012* (2013.01); *G06F 30/396* (2020.01); *H03K 5/24* (2013.01)

(58) Field of Classification Search
CPC .... H02M 3/156; H02M 3/158; H02M 3/1588; H02M 2001/0025; H02M 2001/0048; H03K 3/012; H03K 5/24; G06F 30/396
See application file for complete search history.

(56) References Cited

U.S. PATENT DOCUMENTS

| | | | |
|---|---|---|---|
| 2013/0257403 A1* | 10/2013 | Yen ....................... | H02M 3/156 323/283 |
| 2016/0291682 A1 | 10/2016 | Herfurth et al. | |
| 2018/0294724 A1* | 10/2018 | Mehdi .................. | H03K 17/166 |

FOREIGN PATENT DOCUMENTS

| | | |
|---|---|---|
| CN | 103219877 A | 7/2013 |
| CN | 103529723 A | 1/2014 |

(Continued)

*Primary Examiner* — Sibin Chen
(74) *Attorney, Agent, or Firm* — Novick, Kim & Lee, PLLC; Allen Xue

(57) ABSTRACT

Provided is a low-power-consumption Constant-On-Time (COT) timing circuit design method and a timing circuit. A Resistor-Capacitor (RC) circuit is adopted for timing, to eliminate static power consumption of a timer. A specific structure includes a fourth P-channel Metal Oxide Semiconductor (MOS) transistor M4 of which a source is connected to an input voltage VIN, a gate is connected to a COT control terminal TON_CONTROL and a drain is connected with one end of a fourth resistor R4. The other end of the fourth resistor R4 is connected with one end of a fourth capacitor C4. The other end of the fourth capacitor C4 is grounded. A negative input of a comparator VCMP is connected with a reference voltage, and a positive input is connected between the fourth capacitor C4 and the fourth resistor R4.

7 Claims, 4 Drawing Sheets

(56) References Cited

FOREIGN PATENT DOCUMENTS

| | | |
|---|---|---|
| CN | 105794315 A | 7/2016 |
| CN | 206117506 U | 4/2017 |
| CN | 206149545 U | 5/2017 |

* cited by examiner

LOW-POWER-CONSUMPTION CONSTANT-ON-TIME TIMING CIRCUIT DESIGN METHOD AND TIMING CIRCUIT

FIELD

The present invention relates to the field of electronic circuits, and particularly to a low-power-consumption Constant-On-Time (COT) timing circuit design method and a timing circuit.

BACKGROUND

Power chips on the market are divided into two mainstream types according to modulation manners: Pulse Width Modulation (PWM), Pulse Frequency Modulation (PFM) and PWM-PFM. The two modulation manners have their own advantages and disadvantages.

PWM has the advantages of: 1, low noise, constant switching frequency and easiness for design of an Electro-Magnetic Interference (EMI) noise filter; 2, low ripple voltage; and 3, easiness for implementation of a control manner. PWM has the disadvantages of: 1, low underloading frequency; and 2, slow loop response caused by restriction of EA.

PFM includes COT, Constant-Off-Time (CFT) and hysteresis voltage types, and has the advantages of: 1, high underloading efficiency; 2, low static power consumption; and 3, quick loop response. PFM has the disadvantages of: 1, larger output ripple; and 2, excessively wide EMI harmonic spectrum and difficulty in filtering.

In a common adaptive timer implementation method, a working frequency of a COT modulation BUCK is inversely proportional to a duty ratio: $f_{SW}=t_{ON}/D$, which makes the working frequency of the BUCK change greatly along with the duty ratio and thus brings the problem of audible noise. Therefore, an adaptive COT BUCK emerges on the market. Without consideration of inductor voltage drop and power tube voltage drop, its on time $t_{ON}$ is directly proportional to a duty ratio, which makes a working frequency of the BUCK substantially constant. FIG. 1 is a diagram of a common adaptive COT module circuit. An on time $t_{ON}$ and a working frequency $f_{SW}$ are respectively as follows:

$$t_{ON} = \frac{V_{OUT} \cdot K_2 \cdot C}{I_{ON}} = \frac{V_{OUT} \cdot K_2 \cdot R_3 \cdot (R_1 + R_2) \cdot C}{V_{IN} \cdot R_2} = \frac{D \cdot K_2 \cdot R_3 \cdot (R_1 + R_2) \cdot C}{R_2}, \quad \text{Formula 1}$$

and $$f_{SW} = \frac{1}{t_{ON}/D} = \frac{R_2}{K_2 \cdot R_3 \cdot (R_1 + R_2) \cdot C}. \quad \text{Formula 2}$$

From Formula 2, it can be seen that the working frequency is constant. However, for a low-power-consumption BUCK, FIG. 1 shows the disadvantage of relatively high EA static power consumption. Therefore, a low-power-consumption timer is needed.

SUMMARY

The present invention is directed to provide a low-power-consumption COT timing circuit design method capable of eliminating static power consumption of a timing circuit and a timing circuit.

The present invention is implemented through the following technical solutions.

A low-power-consumption COT timing circuit design method is provided, which specifically includes that a Resistor-Capacitor (RC) circuit is adopted for timing, to eliminate static power consumption of a timer.

The method further includes that: a current is injected into a capacitor of the RC circuit in a manner that a magnitude of the injected current is equal to a magnitude of a current passing through R in the RC circuit for first-order correlation between a timing length of an RC timer and a duty ratio.

The RC circuit adopts an N-stage RC circuit including an RC circuit of the first stage and RC circuits of other stages except the RC circuit of the first stage, and the RC circuits of other stages compensate a capacitor charging and discharging circuit of the RC circuit of the first stage to keep first-order correlation between a capacitor charging current and $V_{IN}$ before capacitor voltage output of the RC circuit of the first stage is $V_{OUT}$*K2, N being a natural number greater than or equal to 2.

A specific method for keeping first-order correlation between the capacitor charging current and $V_{IN}$ before the capacitor voltage output of the RC circuit of the first stage is $V_{OUT}$*K2 (K2 is a set coefficient) includes that a current is injected into a capacitor of the RC circuit of the first stage in a manner that a magnitude of the injected current is equal to a magnitude of a current passing through R in the RC circuit of the first stage for first-order correlation between the timing length of the RC timer and the duty ratio.

A specific method for injecting the current into the capacitor of the RC circuit of the first stage in a manner that the magnitude of the injected current is equal to the magnitude of the current passing through R in the RC circuit of the first stage includes that the current is injected into the capacitor of the RC circuit of the first stage through a resistor of which two ends are connected between R and C of the RC circuit of one stage and between R and C of the RC circuit of the other stage between the RC circuits of two adjacent stages in a manner that the magnitude of the injected current is equal to the magnitude of the current passing through R in the RC circuit of the first stage.

A low-power-consumption COT timing circuit includes a fourth P-channel Metal Oxide Semiconductor (PMOS) transistor M4 of which a source is connected to an input voltage VIN, a gate is connected to a COT control terminal TON_CONTROL and a drain is connected with one end of a fourth resistor R4. The other end of the fourth resistor R4 is connected with one end of a fourth capacitor C4. The other end of the fourth capacitor C4 is grounded. A negative input of a comparator VCMP is connected with a reference voltage, and a positive input is connected between the fourth capacitor C4 and the fourth resistor R4.

The timing circuit further includes a fifth PMOS transistor M5 of which a source is connected to the input voltage VIN, a gate is connected to the COT control terminal TON_CONTROL and a drain is connected with one end of a fifth resistor R5. The other end of the fifth resistor R5 is connected with one end of a fifth capacitor C5. The other end of the fifth capacitor C5 is grounded. The timing circuit further includes a first-stage current injection resistor R_C4 of which one end is connected between the fifth resistor R5 and the fifth capacitor C5 and the other end is connected between the fourth resistor R4 and the fourth capacitor C4.

The timing circuit further includes a sixth PMOS transistor M6 of which a source is connected to the input voltage VIN, a gate is connected to the COT control terminal TON_CONTROL and a drain is connected with one end of a sixth resistor R6. The other end of the sixth resistor is connected with one end of a sixth capacitor C6. The other end of the sixth capacitor C6 is grounded. The timing circuit further includes a second-stage current division resistor R_C5 of which one end is connected between the sixth resistor R6 and the sixth capacitor C6 and the other end is connected between the fifth resistor R5 and the fifth capacitor C5.

The timing circuit further includes a fourth switch K4 connected in parallel with the fourth capacitor C4, and the fourth switch K4 is connected with the COT control terminal TON_CONTROL, and is controlled to turn off or turn on by the COT control terminal TON_CONTROL.

Compared with the prior art, the present invention has the beneficial effects that static power consumption of the COT timing circuit may be eliminated, thereby reducing the power consumption of the whole circuit; and the implemented circuit is simple in structure and low in cost.

DETAILED DESCRIPTION OF THE EMBODIMENTS

Figure 1:
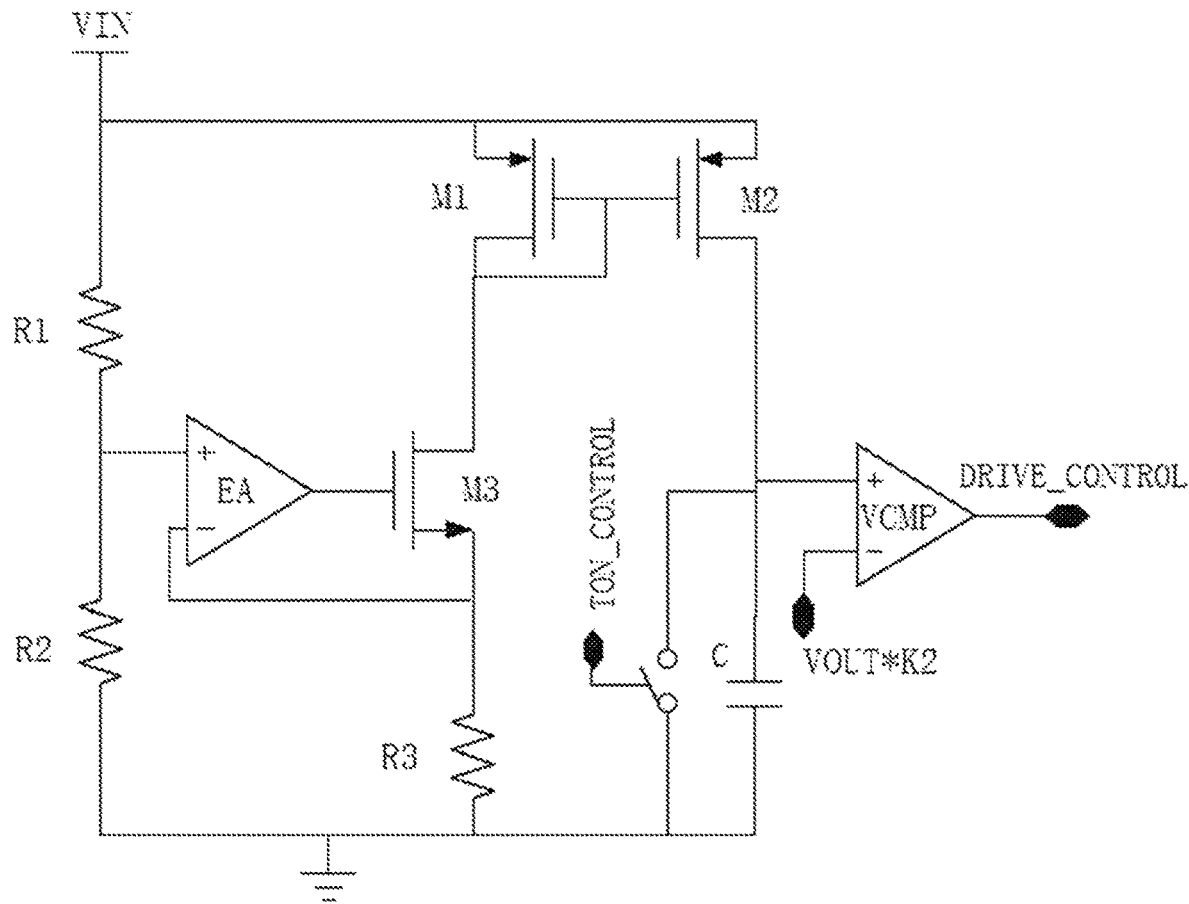
FIG. 1 is an implementation circuit diagram of a common timer according to the prior art.

In order to make the purpose, technical solutions and advantages of the present invention clearer, the present invention will further be described below in combination with the accompanying drawings and embodiments in detail. It should be understood that the specific embodiments described here are only adopted to explain the present invention and not intended to limit the present invention.

Any characteristic disclosed in the description (including the abstract and the accompanying drawings) may be replaced with another equivalent or alternative characteristic with a similar purpose, unless otherwise stated. That is, each characteristic is merely an example in a series of equivalent or similar characteristics, unless otherwise stated.

For a low-power-consumption COT timing circuit design method, a core thought of the present invention is specifically as follows: an RC circuit is adopted for timing, to eliminate static power consumption of a timer. A low-power-consumption timer adopts the RC circuit for timing. In such a manner, the static power consumption of the timer is eliminated by the circuit, and only switching loss in a resistor R during charging of a capacitor is required to be considered.

However, since there is no first-order correlation between time t required by the RC circuit to charge the capacitor to a voltage $V_{OUT}*K2$ and a duty ratio $$\frac{V_{OUT}}{V_{IN}},$$

a COT working frequency determined by the timer decreases along with increase of the duty ratio to further bring the hazard of audible noise.

For overcoming this shortcoming, the method further includes that a current is injected a capacitor of the RC circuit in a manner that a magnitude of the injected current is equal to a magnitude of a current passing through R in the RC circuit, thereby implementing first-order strong correlation between a timing length of an RC timer and a duty ratio and further achieving independence between the working frequency and the duty ratio.

Another relatively specific method includes that: the RC circuit adopts an N-stage RC circuit including an RC circuit of the first stage and RC circuits of other stages except the RC circuit of the first stage, and the RC circuits of other stages compensate a capacitor charging and discharging circuit of the RC circuit of the first stage to keep first-order correlation between a capacitor charging current and VIN before capacitor voltage output of the RC circuit of the first stage is $V_{OUT}*K2$, thereby achieving independence between the working frequency and the duty ratio, N being a natural number greater than or equal to 2.

More specifically, as a solution, a specific method for keeping first-order correlation between the capacitor charging current and VIN before the capacitor voltage output of the RC circuit of the first stage is $V_{OUT}*K2$ includes that a current is injected into a capacitor of the RC circuit of the first stage in a manner that a magnitude of the injected current is equal to a magnitude of a current passing through R in the RC circuit of the first stage, thereby implementing first-order strong correlation between the timing length of the RC timer and the duty ratio and further achieving independence between the working frequency and the duty ratio.

As a specific solution, a specific method for injecting the current into the capacitor of the RC circuit of the first stage in a manner that the magnitude of the injected current is equal to the magnitude of the current passing through R in the RC circuit of the first stage includes that the current is injected into the capacitor of the RC circuit of the first stage through a resistor of which two ends are connected between R and C of the RC circuit of one stage and between R and C of the RC circuit of the other stage between the RC circuits of two adjacent stages in a manner that the magnitude of the injected current is equal to the magnitude of the current passing through R in the RC circuit of the first stage.

In the technical solutions of the present invention, N is equal to 2 or 3.

Based on the design method, the present invention provides a low-power-consumption COT timing circuit, which includes a fourth PMOS transistor M4 of which a source is connected to an input voltage VIN, a gate is connected to a COT control terminal TON_CONTROL and a drain is connected with one end of a fourth resistor R4. The other end of the fourth resistor R4 is connected with one end of a fourth capacitor C4. The other end of the fourth capacitor C4 is grounded. A negative input of a comparator VCMP is connected with a reference voltage, and a positive input is connected between the fourth capacitor C4 and the fourth resistor R4.

Figure 2:
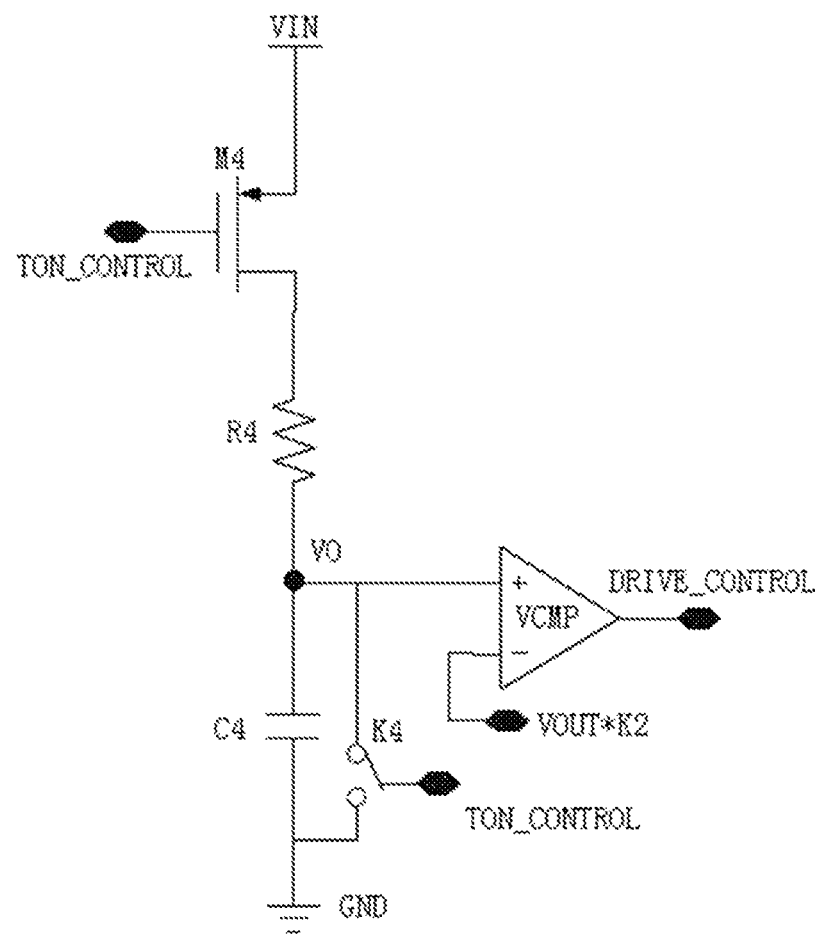
FIG. 2 is a schematic diagram of a timing circuit according to an embodiment of the present invention.

As shown in FIG. 2, a step signal from TON_CONTROL to GND is equivalent to a step signal of adding VIN to the fourth resistor R4, an output voltage $V_O=V_{OUT}*K2$ of the fourth capacitor C4 meets (source and drain voltage drops of the MOS transistor are neglected):

$$V_O = V_{IN}\left(1 - e^{\frac{-t}{R4 \cdot C4}}\right), \quad \text{Formula 3}$$

and time t required by the fourth capacitor C4 to output a voltage $V_O$ meets:

$$t = -R4 \cdot C4 \cdot \ln\left(1 - \frac{V_O}{V_{IN}}\right). \quad \text{Formula 4}$$

Taylor expansion is performed on Formula 4 to obtain:

$$t = -R4 \cdot C4 \cdot \sum_{n=1}^{\infty} \frac{(-1)^{2n+1}}{n}\left(\frac{V_O}{V_{IN}}\right)^n = \quad \text{Formula 5}$$

$$R4 \cdot C4 \cdot \left[\frac{V_O}{V_{IN}} + \frac{1}{2}\left(\frac{V_O}{V_{IN}}\right)^2 + \frac{1}{3}\left(\frac{V_O}{V_{IN}}\right)^3 + \ldots + \frac{1}{n}\left(\frac{V_O}{V_{IN}}\right)^n\right].$$

A working frequency f is:

$$f = \frac{1}{t/D} = \frac{V_{IN}/V_O}{-R4 \cdot C4 \cdot \sum_{n=1}^{\infty}\frac{(-1)^{2n+1}}{n}\left(\frac{V_O}{V_{IN}}\right)^n} = \quad \text{Formula 6}$$

$$\frac{1}{R4 \cdot C4 \cdot \sum_{n=1}^{\infty}\frac{1}{n}\left(\frac{V_O}{V_{IN}}\right)^{n-1}}.$$

Herein, n is a natural number.

Timing of such a timer with a single RC delay circuit of one stage does not form first-order correlation with a duty ratio, so that the working frequency f is negatively correlated with the duty ratio.

Figure 3:
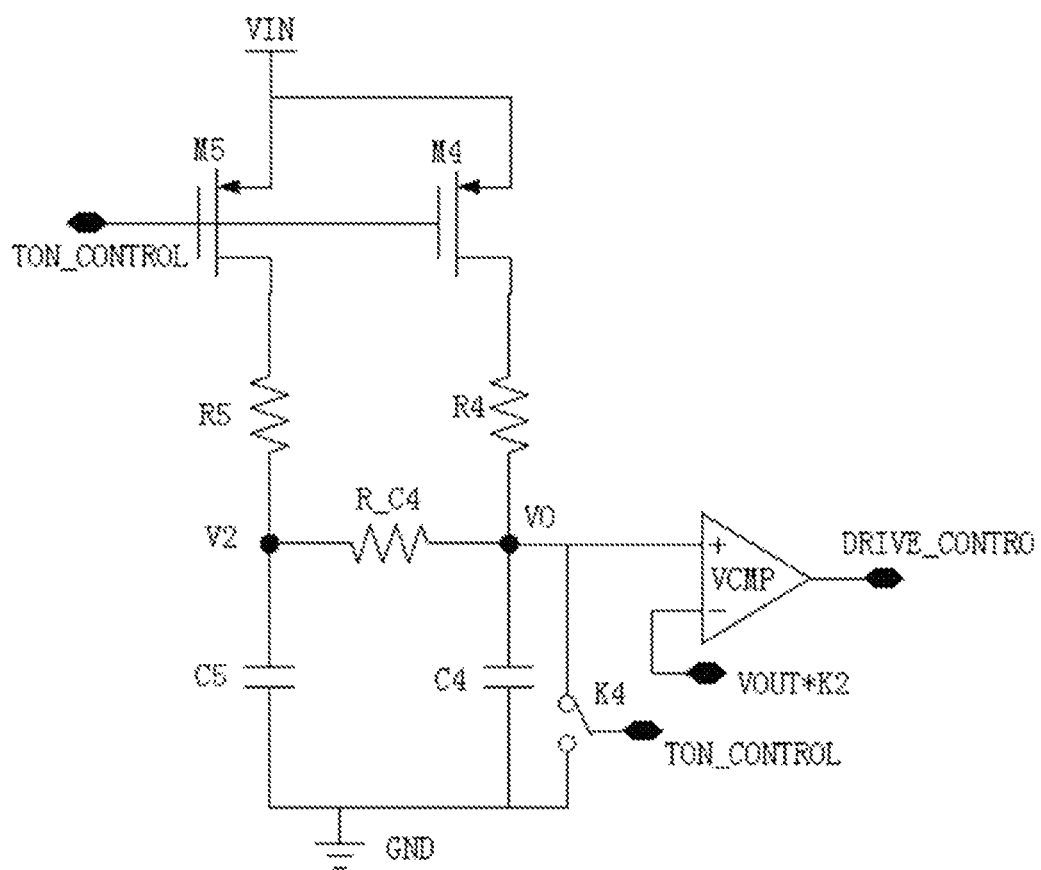
FIG. 3 is a schematic diagram of a timing circuit according to an embodiment of the present invention.

As a further improvement of the circuit, as shown in FIG. 3, the circuit further includes a fifth PMOS transistor M5 of which a source is connected to the input voltage VIN, a gate is connected to the COT control terminal TON_CONTROL and a drain is connected with one end of a fifth resistor R5. The other end of the fifth resistor R5 is connected with one end of a fifth capacitor C5. The other end of the fifth capacitor C5 is grounded. The timing circuit further includes a first-stage current injection resistor R_C4 of which one end is connected between the fifth resistor R5 and the fifth capacitor C5 and the other end is connected between the fourth resistor R4 and the fourth capacitor C4.

Time required by the one-stage RC timer to charge the fourth capacitor C4 to $V_{OUT}*K2$ does not form first-order correlation with the duty ratio because a charging current $I_{R4}$ of the fourth capacitor C4 is exponentially attenuated with time. If a current $I_{R\_C4}$ is injected into the fourth capacitor C4 through the first-stage current injection resistor R_C4 and its magnitude is equal to a magnitude of the current $I_{R4}$ attenuated with time, a timing length of the RC timer may form first-order strong correlation with the duty ratio, thereby achieving independence between the working frequency and the duty ratio.

Timing t of a two-stage RC timer shown in FIG. 3 is analyzed (the source and drain voltage drops of the MOS transistor are neglected):

$$I_{R4} = \frac{V_{IN} - V_O}{R_4} = \frac{V_{IN} - V_{IN}\left(1 - e^{\frac{-t}{R4 \cdot C4}}\right)}{R_4} = \frac{V_{IN}}{R_4} \cdot e^{\frac{-t}{R4 \cdot C4}}. \quad \text{Formula 7}$$

Taylor expansion is performed and a cubic term is kept to obtain:

$$I_{R4} = \frac{V_{IN}}{R_4} \cdot e^{\frac{-t}{R4 \cdot C4}} = \frac{V_{IN}}{R_4} \cdot \sum_{n=0}^{\infty} \frac{\left(-\frac{t}{R4 \cdot C4}\right)^n}{n!} = \quad \text{Formula 8}$$

$$\frac{V_{IN}}{R_4} \cdot \left(1 - \frac{t}{R4 \cdot C4} + \frac{1}{2}\left(\frac{t}{R4 \cdot C4}\right)^2 - \frac{1}{6}\left(\frac{t}{R4 \cdot C4}\right)^3\right).$$

A voltage of a node V2 between the fifth resistor R5 and the fifth capacitor C5 is still considered as VIN to charge C2 through R2 without considering influence of the circuit on a node voltage of C5 from R_C4, and then:

$$V_2 = V_{IN}\left(1 - e^{\frac{-t}{R5 \cdot C5}}\right). \quad \text{Formula 9}$$

Formula 9 and Formula 3 may be combined to obtain:

$$I_{R\_C4} = \frac{V_2 - V_O}{R\_C4} = \frac{V_{IN}}{R\_C4}\left(e^{\frac{-t}{R4 \cdot C4}} - e^{\frac{-t}{R5 \cdot C5}}\right). \quad \text{Formula 10}$$

The charging current of the capacitor C4 is a superposition of $I_{R4}$ and $I_{R\_C4}$: it is set that R_C4=R4, and $$I_{C4} = I_{R4} + I_{R\_C4} = \frac{V_{IN}}{R4}\left(2 \cdot e^{\frac{-t}{R4 \cdot C4}} - e^{\frac{-t}{R5 \cdot C5}}\right). \quad \text{Formula 11}$$

Taylor expansion is performed and a cubic term is kept to obtain:

$$I_{C4} = \frac{V_{IN}}{R4}\left(2 \cdot \left(1 - \frac{t}{R4 \cdot C4} + \frac{1}{2}\left(\frac{t}{R4 \cdot C4}\right)^2 - \frac{1}{6}\left(\frac{t}{R4 \cdot C4}\right)^3\right) - \quad \text{Formula 12}\right.$$

$$\left.\left(1 - \frac{t}{R5 \cdot C5} + \frac{1}{2}\left(\frac{t}{R5 \cdot C5}\right)^2 - \frac{1}{6}\left(\frac{t}{R5 \cdot C5}\right)^3\right)\right).$$

Compilation is performed to obtain:

$$I_{C4} = \frac{V_{IN}}{R4}\left(1 + t\left(-\frac{2}{R4 \cdot C4} + \frac{1}{R5 \cdot C5}\right) + \quad \text{Formula 13}\right.$$

$$t^2\left(\left(\frac{1}{R4 \cdot C4}\right)^2 - \frac{1}{2}\left(\frac{1}{R5 \cdot C5}\right)^2\right) +$$

$$\left.t^3\left(-\frac{1}{3}\left(\frac{1}{R4 \cdot C4}\right)^3 + \frac{1}{6}\left(\frac{1}{R5 \cdot C5}\right)^3\right)\right).$$

It is set that R5·C5=R4·C4/2, and then a first-order term of t is eliminated to obtain:

$$I_{C4} = \frac{V_{IN}}{R4}\left(1 - \left(\frac{1}{R4 \cdot C4}\right)^2 t^2 + \left(\frac{1}{R4 \cdot C4}\right)^3 t^3\right). \quad \text{Formula 14}$$

-continued

If $t \ll R4 \cdot C4$, $$I_{C4} = \frac{V_{IN}}{R4}\left(1 - \left(\frac{1}{R4 \cdot C4}\right)^2 t^2 + \left(\frac{1}{R4 \cdot C4}\right)^3 t^3\right),$$

$I_{C4}$ in Formula 14 is approximately considered as a constant, and the time t required by the fourth capacitor C4 to charge the voltage to $V_{OUT}*K2$ meets, if $t \ll R4 \cdot C4$:

$$t = \frac{V_{OUT} \cdot K2 \cdot C4}{\frac{V_{IN}}{R4}\left(1 - \left(\frac{1}{R4 \cdot C4}\right)^2 t^2 + \left(\frac{1}{R4 \cdot C4}\right)^3 t^3\right)} \approx \quad \text{Formula 15}$$

$$\frac{V_{OUT} \cdot K2 \cdot R4 \cdot C4}{V_{IN}}.$$

If the duty ratio is $$\frac{V_{OUT}}{V_{IN}},$$

a period T corresponding to the COT working frequency f determined by the timing circuit meets:

$$T = \frac{t}{D} = \frac{V_{OUT} \cdot K2 \cdot C4}{\frac{V_{IN}}{R4}\left(1 - \left(\frac{1}{R4 \cdot C4}\right)^2 t^2 + \left(\frac{1}{R4 \cdot C4}\right)^3 t^3\right)} \cdot \frac{V_{IN}}{V_{OUT}} = \quad \text{Formula 16}$$

$$\frac{K2 \cdot R4 \cdot C4}{\left(1 - \left(\frac{1}{R4 \cdot C4}\right)^2 t^2 + \left(\frac{1}{R4 \cdot C4}\right)^3 t^3\right)} \cdot R4.$$

A relationship between period accuracy and $$\frac{V_{OUT} \cdot K2}{V_{IN}}$$

is analyzed in combination with Formula 15 and Formula 16:

$$T = \frac{K2 \cdot R4 \cdot C4}{\left(1 - \left(\frac{V_{OUT} \cdot K2}{V_{IN}}\right)^2 + \left(\frac{V_{OUT} \cdot K2}{V_{IN}}\right)^3\right)}. \quad \text{Formula 17}$$

$R5 \cdot C5 < R4 \cdot C4/2$ of the two-stage RC timer may bring the following condition.

Figure 4:
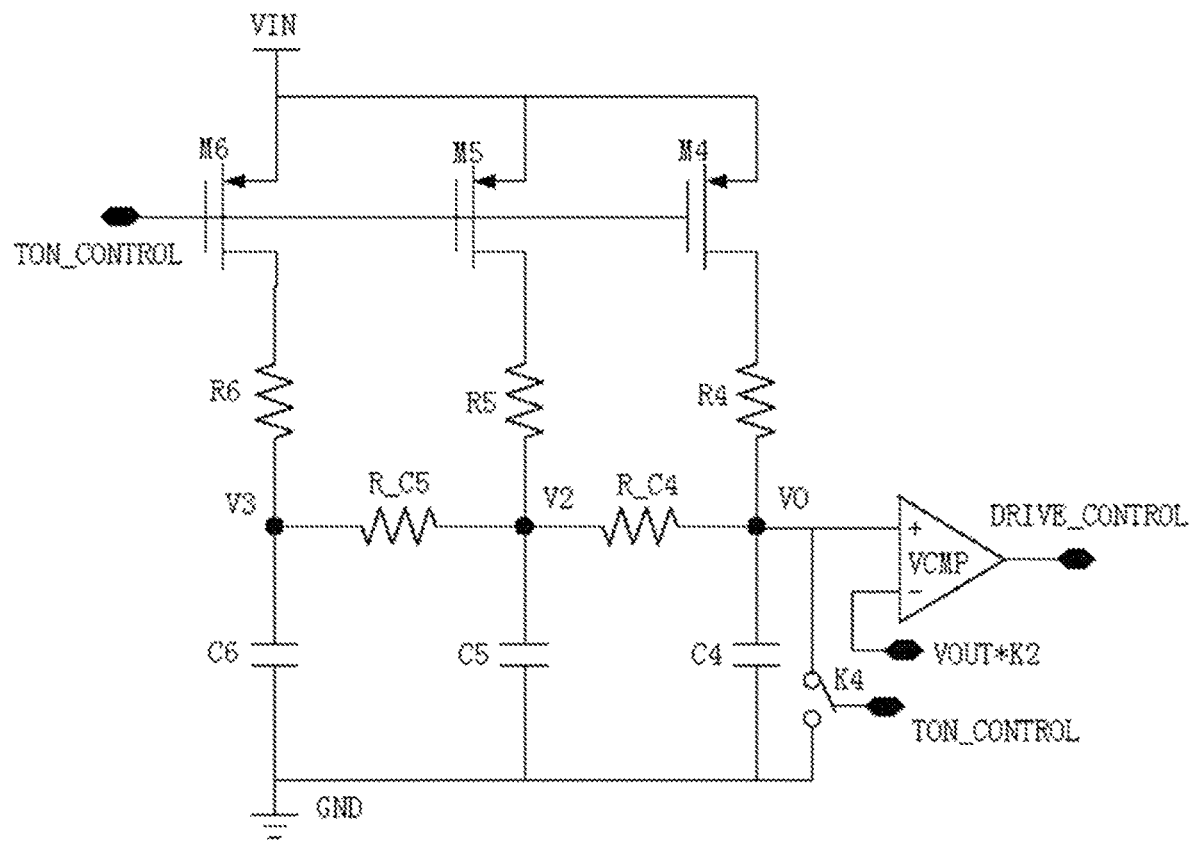
FIG. 4 is a schematic diagram of a timing circuit according to an embodiment of the present invention.

At the start of charging of the capacitor C4, a current for compensation from R_C4 to C4 is excessively high, and charging is accelerated. Therefore, a third-stage RC branch circuit is added to the circuit, current division is performed from the node V2 at the start of charging of C4, and output ranges, linearly related to time, of the current for compensation from R_C4 to C4 and $V_O$ is reduced. As shown in FIG. 4, a specific circuit structure is as follows.

The circuit further includes a sixth PMOS transistor M6 of which a source is connected to the input voltage VIN, a gate is connected to the COT control terminal TON_CONTROL and a drain is connected with one end of a sixth resistor R6. The other end of the sixth resistor R6 is connected with one end of a sixth capacitor C6. The other end of the sixth capacitor C6 is grounded. The timing circuit further includes a second-stage current division resistor R_C5 of which one end is connected between the sixth resistor R6 and the sixth capacitor C6 and the other end is connected between the fifth resistor R5 and the fifth capacitor C5.

The circuit further includes a fourth switch K4 connected in parallel with the fourth capacitor C4, and the fourth switch K4 is connected with the COT control terminal TON_CONTROL, and is controlled to turn off or turn on by the COT control terminal TON_CONTROL to rapidly discharge voltages at the two ends of the fourth capacitor C4.

In addition, as a further improvement, the circuit further includes a fifth switch K5 connected in parallel with the fifth capacitor C5, and the fifth switch K5 is connected with the COT control terminal TON_CONTROL, and is controlled to turn off or turn on through the COT control terminal TON_CONTROL to rapidly discharge voltages at the two ends of the fifth capacitor C5.

In addition, as a further improvement, the circuit further includes a sixth switch K6 connected in parallel with the sixth capacitor C6, and the sixth switch K6 is connected with the COT control terminal TON_CONTROL, and is controlled to turn off or turn on through the COT control terminal TON_CONTROL to rapidly discharge voltages at the two ends of the sixth capacitor C6.

Three specific circuit structures are described above, including a timing circuit with a single RC circuit of one stage, a timing circuit with RC circuits of two stages and a timing circuit with RC circuits of three stages. All of them are specific circuit structures designed on the basis of the low-power-consumption COT timing method. Those skilled in the art may also design circuit structures in other forms according to various circuit theories in combination with the low-power-consumption COT timing method. Circuits, in specific forms, designed on the basis of the design thought of the low-power-consumption COT timing method of the present invention shall all fall within the scope of protection of the present invention.

The invention claimed is:

1. A method for operating a Constant-On-Time (COT) timing circuit, comprising:
    making a COT timing circuit that is a Resistor-Capacitor (RC) circuit, wherein the RC circuit comprises at least a first stage circuit and a second stage circuit, wherein the first stage circuit comprises a first capacitor and a first resistor, the second stage circuit comprises a second capacitor and a second resistor; and
    charging the first capacitor with a charging current in a manner that a magnitude of the charging current is equal to a magnitude of a current passing through the resistor, and the charging current and a voltage input to the RC circuit maintains a first-order correlation prior to a voltage output from the first capacitor equals a reference voltage, wherein the reference voltage is proportional to the output voltage of the RC circuit.

2. The method according to claim 1, wherein a magnitude of the charging current is equal to a magnitude of a current passing through the first resistor so that a timing length of the RC circuit and a duty ratio of the RC circuit maintains a first-order correlation.

3. The method according to claim 2, further comprising:
    connecting a resistor between the first stage circuit and the second stage circuit, wherein a first end of the resistor is connected to a line disposed between the first resistor and the first capacitor, and a second end of the resistor is connected to a line disposed between the second resistor and the second capacitor.

4. The method according to claim 1, wherein the RC circuit comprises a third stage circuit.

5. A low-power-consumption Constant-On-Time (COT) timing circuit, comprising: a first stage circuit, a second stage circuit, a first inter-stage resistor disposed between the first stage circuit and the second stage circuit, and a comparator, wherein the first stage circuit comprises a first P-channel Metal Oxide Semiconductor (PMOS) transistor of which a source is connected to an input voltage, a gate is connected to a COT control terminal (TON_CONTROL), and a drain is connected with a first end of a first resistor, wherein a second end of the first resistor is connected to a first end of a first capacitor, and a second end of the first capacitor is grounded, a negative input of a comparator is connected with a reference voltage, and a positive input of the comparator is connected to a line that connects the second end of the first resistor and the first end of the first capacitor, wherein the second stage circuit comprises a second PMOS transistor of which a source is connected to the input voltage, a gate is connected to the COT control terminal, and a drain is connected with the first end of a second resistor, wherein a second end of the second resistor is connected to the first end of a second capacitor, and the second end of the second capacitor is grounded, wherein a first end of the first inter-stage resistor is connected to the line that connects the second end of the first resistor and the first end of the first capacitor, and a second end of the first inter-stage resistor is connected to a line that connects the second end of the second resistor and the first end of the second capacitor.

6. The low-power-consumption COT timing circuit according to claim 5, further comprising a third stage circuit and a second inter-stage resistor, wherein the third stage circuit comprises a third PMOS transistor of which a source is connected to the input voltage, a gate is connected to the COT control terminal, and a drain is connected with a first end of a third resistor, wherein a second end of the third resistor is connected to the first end of a third capacitor, and a second end of the third capacitor is grounded, wherein a first end the second inter-stage resistor is connected to a line that connects the second end of the second resistor and the first end of the second capacitor, and a second end of the second inter-stage resistor is connected to a line that connects the second end of the third resistor and the first end of the third capacitor.

7. The low-power-consumption COT timing circuit according to claim 5, further comprising a switch connected in parallel with the first capacitor, wherein the switch is connected with the COT control terminal and is controlled to turn off or turn on by the COT control terminal.

* * * * *